United States Patent

Huang

Patent Number: 5,457,828
Date of Patent: Oct. 17, 1995

[54] JOINT OF A PLAYPEN

[76] Inventor: Sieno T. M. Huang, No. 26, Lane 348, Ching Hu Tsun, Lin Kou Hsiang, Taipei Hsien, Taiwan

[21] Appl. No.: 274,254

[22] Filed: Jul. 13, 1994

[51] Int. Cl.$^6$ .................... A47D 7/00; F16C 11/10
[52] U.S. Cl. .................... 5/99.1; 16/347; 403/102; 403/319
[58] Field of Search .................... 5/99.1; 403/102, 403/84, 319; 16/347

[56] References Cited

U.S. PATENT DOCUMENTS

| | | | |
|---|---|---|---|
| 4,611,945 | 9/1986 | Diego | 403/102 |
| 4,712,773 | 12/1987 | Larson | 5/99.1 |
| 4,934,025 | 6/1990 | Mariol | 5/99.1 |
| 5,211,498 | 5/1993 | Huang | 5/99.1 |
| 5,364,201 | 11/1994 | La Barre | 403/102 |

*Primary Examiner*—Alexander Grosz
*Attorney, Agent, or Firm*—Poms, Smith, Lande & Rose

[57] ABSTRACT

A joint joins together two tubular rails of a playpen. The joint includes a shell. A first block and a second block are pivotally received in the shell. A first tubular element and a second tubular element are each secured in one of the tubular rails. Each of the tubular element defines a first axial passage and a second axial passage. A first bolt with a head is inserted through the second axial passage defined in the first tubular element while the head thereof is retained in the first axial passage defined in the first tubular element. The first bolt is secured to the first block. A second bolt with a head is inserted through the second axial passage defined in the second tubular element while the head thereof is retained in the first axial passage defined in the second tubular element. The second bolt is secured to the second block. The first block defines a longitudinal recess and a longitudinal slot in communication with the longitudinal recess defined therein. A spring is received in the longitudinal recess defined in the first block. A latch is received in the longitudinal recess defined in the first block. The first tubular element defines a longitudinal slit. The latch is biased by the spring into the longitudinal slit thus keeping the shell from being pivoted relative to the tubular rail. The latch can be disengaged from the longitudinal slit thus allowing the shell to be pivoted relative to the tubular rail.

5 Claims, 3 Drawing Sheets

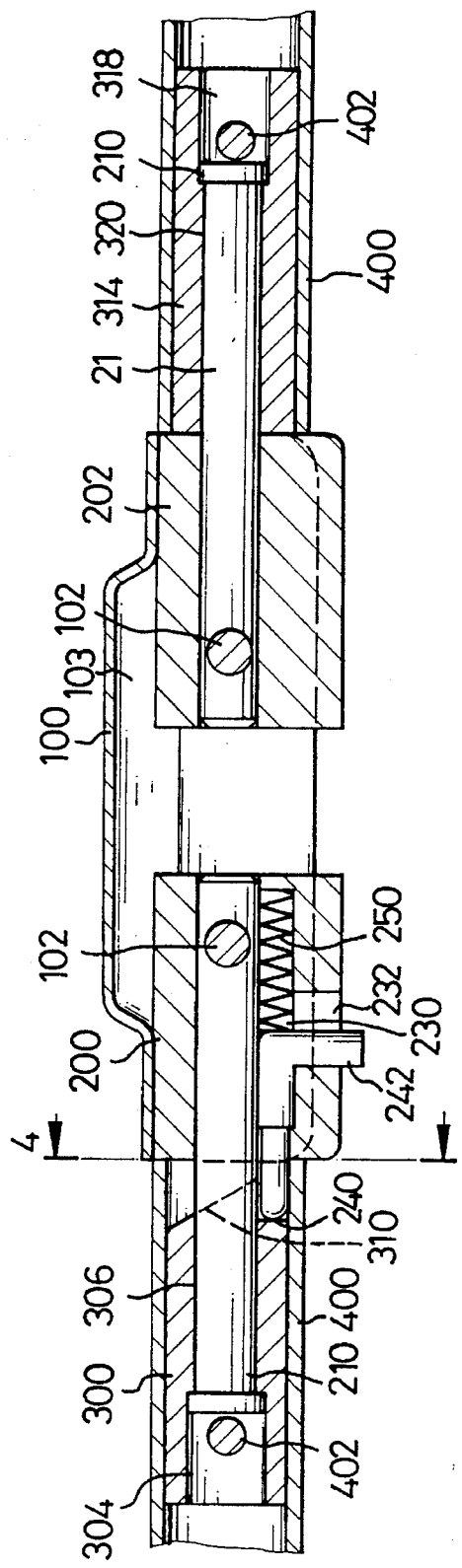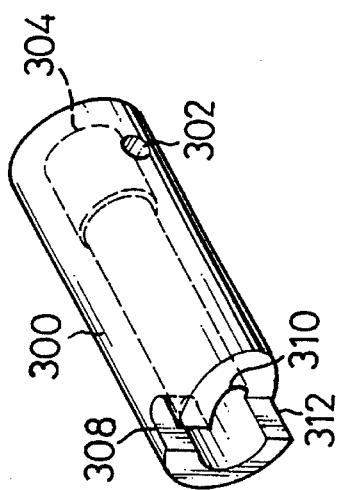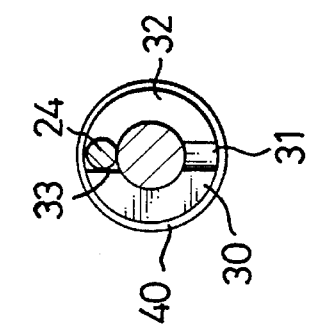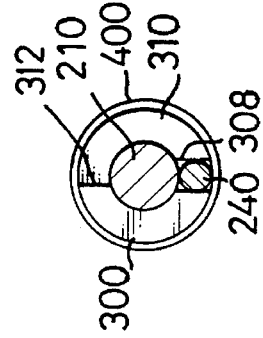

5,457,828

1

JOINT OF A PLAYPEN

BACKGROUND OF THE INVENTION

This invention relates to a joint of a playpen.

The most closely related reference is U.S. Pat. No. 5,211,498 issued to the present inventor on May 18, 1993. Such a joint makes it easy to collapse a playpen using such a joint. However, there are two problems to be overcome in such a joint. The first problem is that any child within may be hurt when the playpen is unintentionally collapsed as the joint can be easily pivoted. The second problem is that the rigidity of such a joint is not sufficient. This invention is intended to solve the above-mentioned problems.

SUMMARY OF THE INVENTION

It is an objective of this invention to provide a playpen with a joint which can be retained in an extended position.

It is another objective of this invention to provide a playpen with a joint which is strong.

The objectives of this invention are achieved by providing a joint including a shell with a strip and two walls projecting from the strip. The walls of the shell defines a first transverse passage and a second transverse passage. A first block defines a transverse passage, a longitudinal passage in communication with the transverse passage defined therein, a longitudinal recess in communication with the longitudinal passage defined therein and a longitudinal slot in communication with the longitudinal recess defined therein. The first block is disposed in the shell so that the transverse passage defined therein is aligned with the first transverse passage defined in the shell. A spring is received in the longitudinal recess defined in the first block. A trigger transversely projects from a latch. The latch is received in the longitudinal recess defined in the first block while the trigger is inserted through the longitudinal slot defined in the first block. A first tubular element defines a longitudinal slit with an open end, transverse passage, a first axial passage in communication with the transverse passage defined therein, a second axial passage in communication with the first axial passage defined therein. A first bolt includes a head and a transverse passage. The first bolt is inserted through the second axial passage defined in the first tubular element and the longitudinal passage defined in the first block so that the transverse passage defined in the first bolt is aligned with the transverse passage defined in the first block and the first transverse passage defined in the shell. A first pin is inserted through the first transverse passage defined in the shell, the transverse passage defined in the first block and the transverse passage defined in the first bolt. A second block defines a transverse passage and a longitudinal recess in communication with the transverse passage defined therein. The second block is disposed in the shell so that the transverse passage defined therein is aligned with the second transverse passage defined in the shell. A second tubular element defines a transverse passage, a first axial passage in communication with the transverse passage defined therein and a second axial passage in communication with the first axial passage defined therein. A second bolt includes a head and a transverse passage. The second bolt is inserted through the second axial passage defined in the second tubular element and the longitudinal passage defined in the second block so that the transverse passage defined in the second bolt is aligned with the transverse passage defined in the second block and the second transverse passage defined in the shell.

2

A second pin is inserted through the first transverse passage defined in the shell, the transverse passage defined in the second block and the transverse passage defined in the second bolt. The latch can be biased by means of the spring into the slit thus preventing the rotation of the shell relative to the first tubular element, the latch can be disengaged from the slit by pulling the trigger thus allowing the rotation of the shell in respect to the first tubular element.

For a better understanding of this invention and objects thereof, a study of the detailed description of the embodiments described hereinafter should be made in relation to the accompanying drawings.

BRIEF DESCRIPTION OF THE DRAWINGS

FIG. 3 is a cross-sectional side view of a joint of a playpen as shown in FIG. 2;

FIG. 4 is a cross-sectional view taken along a line 4—4 in FIG. 3 in order to show a joint in a first position; and FIG. 5 is a similar view to FIG. 4 but showing a joint in a second position; and FIG. 6 is a perspective view of a first tubular element used in a joint of playpen as shown in FIG. 2.

DETAILED DESCRIPTION OF THE PREFERRED EMBODIMENT

Figure 1:
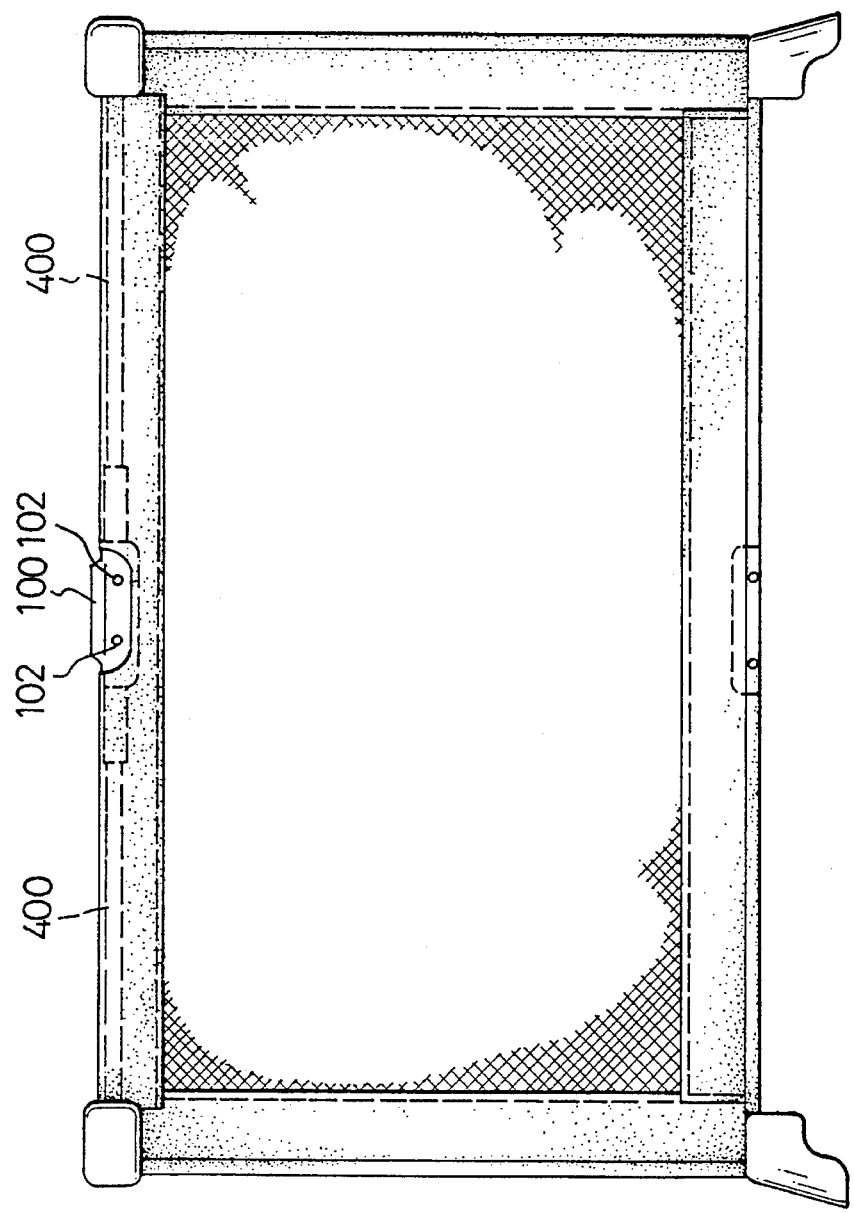
FIG. 1 is a side view of a playpen employing a joint in accordance with the preferred embodiment of this invention.

FIG. 1 shows a playpen using a joint in accordance with the preferred embodiment of this invention. The joint links two tubular rails 400 to each other. Similar to U.S. Pat. No. 5,211,498, the joint can be pivoted about the tubular rails 400 between a first position and a second position. In the first position of the joint, the tubular rails 400 are retained in an aligned position by means of the joint when they are subjected to a downward load as a child is laid in the playpen. In the second position of the joint, the tubular rails 400 can be moved to a folded position.

Figure 2:
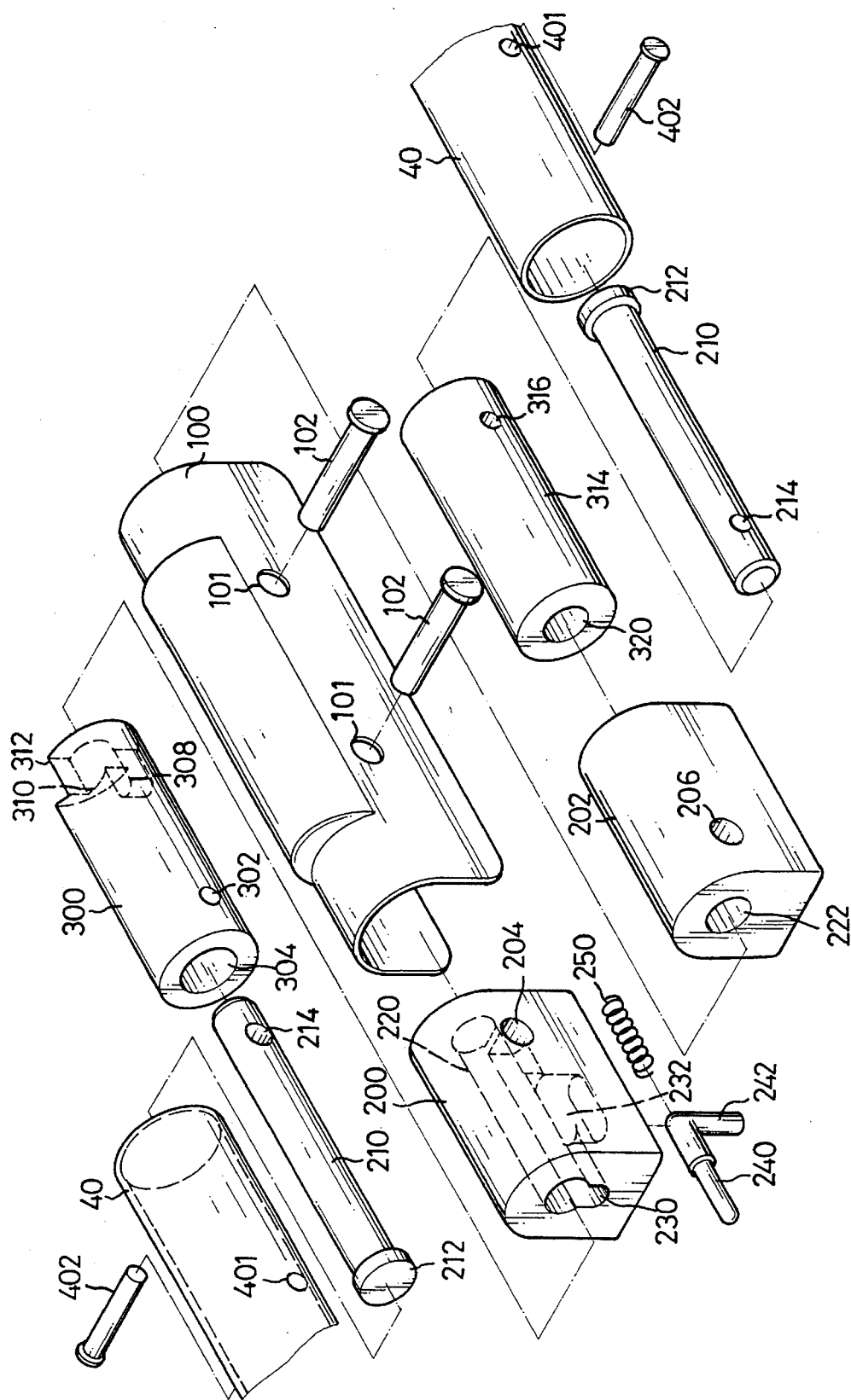
FIG. 2 is an exploded view of a joint of a playpen in accordance with the preferred embodiment of this invention.

Referring to FIG. 2, the joint includes a shell 100 including a strip and two walls projecting from the strip. The tubular rails 400 are pivotally linked to the joint, between the walls. In the first position of the joint, the strip thereof is disposed above the tubular rails 400. The tubular rails 400 apt to be folded downwardly when the tubular rails 400 are subjected to a downward load when a child is laid in the playpen. However, as the tubular rails 400 are abutted against the strip of the joint, the tubular rails 400 are kept from being pivoted. In the second position of the joint, the strip thereof is disposed below the tubular rails 400, therefore, the tubular rails 400 can be folded. The middle portion of the strip of the shell 100 is pressed so as to define a chamber 103 (see FIG. 3) for receiving ends of the tubular rails 400 when the tubular rails 400 are folded. The shell 100 defines two transverse passages 101.

The joint further includes a first block 200 and a second block 202. The first block 200 defines a transverse passage 204, a longitudinal passage 220, a longitudinal recess 230 and a longitudinal slot 232. The transverse passage 204 is in communication with the longitudinal passage 220. The longitudinal passage 220 is in communication with the longitudinal recess 230. The longitudinal recess 230 defines an open end and a closed end. The longitudinal recess 230 is in communication with the longitudinal slot 232.

A trigger 242 transversely projects from a latch 240. However, the latch 240 and the trigger 242 can be molded as two separated element and joined together by any appropriate means. A spring 250 is inserted through the longitudinal slot 232 defined in the first block 200 in order to be received in the longitudinal recess 230 defined in the first block 200. The latch 240 is inserted by through longitudinal slot 232 into the longitudinal recess 230 while the trigger 242 is inserted through the longitudinal slot 232. The spring 250 is compressed between the closed end of the longitudinal recess 230 and the trigger 242. That is, the latch 240 is biased by means of the spring 250 so that the free end of the latch 240 is inserted through the open end of the longitudinal recess 230. The free end of the trigger 242 is disposed outside the longitudinal slot 232 so that the free end of the latch 240 can be moved into the longitudinal recess 230 by pulling the trigger 242.

The joint further includes a first tubular element 300 defining a transverse passage 302, a first axial passage 304 and a second axial passage 306 (see FIG. 3). The transverse passage 302 is in communication with the first axial passage 304. The first axial passage 304 is in communication with the second axial passage 306. The first tubular element 300 includes a first end and a second end. The second end of the first tubular element defines a longitudinal slit 308 and a longitudinal stop 312 diametrically opposite to the longitudinal slit 308. The second end of the first tubular element 300 includes a slope 310 descending from the longitudinal slit 308 to the longitudinal stop 312.

The second block 202 defines a transverse passage 206 and a longitudinal passage 222. The transverse passage 206 is in communication with the longitudinal passage 222.

The joint further includes a second tubular element 314 defining a transverse passage 316, a first axial passage 318 and a second axial passage 320. The transverse passage 316 is in communication with the first axial passage 318.

The joint further includes two bolts 210 each defining a head 212 at an end and a transverse passage 214 near an opposite end. One of the bolts 210 is insertable through the second axial passage 306 defined in the first tubular element 300 and the longitudinal passage 220 defined in the first block 200 while the head 212 is retained in the first axial passage 304 defined in the first tubular element 300. The first block 200 is disposed in the shell 100. A pin 102 is inserted through one of the transverse passages 101 defined in the shell 100, the transverse passage 204 defined in the first block 200 and the transverse passage 214 defined in one of the bolts 210, so that the first block 200, one of the bolts 210 and the first tubular element 300 are joined together and pivotally linked to the shell 100 by means of one of the pins 102.

Similarly, the remaining bolt 210 is inserted through the second axial passage 320 defined in the second tubular element 314 and the longitudinal passage 222 defined in the second block 202 while the head 212 is retained in the first axial passage 318 defined in the second tubular element 314. A pin 102 is inserted through the remaining transverse passage 101 defined in the shell 100, the transverse passage 222 defined in the second block 202 and the transverse passage 214 defined in the remaining bolt 210, so that the second block 202, the remaining bolt 210 and the second tubular element 304 are joined together and pivotally linked to the shell 100 by means of the remaining pin 102.

Each of the tubular rails 400 defines a transverse passage 401. A pin 402 is inserted through the transverse passage 401 defined in one of the tubular rails 400 and the transverse passage 302 defined in the first tubular element 300, connecting the first tubular element with one of the tubular rails 400. A pin 402 is inserted through the transverse passage 401 defined in the remaining tubular rail 400 and the transverse passage 316 defined in the second tubular element 314, connecting the second tubular element 314 with the remaining tubular rail 400.

Referring to FIG. 3, the tubular rails 400 are aligned with each other when the playpen is in use. In this position, the latch 240 is biased by means of the spring 250 into the slit 308, thus preventing the rotation of the shell 100 relative to the tubular rails 400. The tubular rails 400 will not be folded, i.e., the playpen will not be collapsed. Therefore, the safety of any child within the playpen is guaranteed.

A user must fold the tubular rails 400 in order to collapse the playpen. To fold the tubular rails 400, the latch 240 is disengaged from the slit 308 by pulling the trigger 242. The shell 100 is pivoted counterclockwise (see FIG. 4). When the latch is not aligned with the slit 308, the trigger 242 can be released. The latch 242 is slid on the slope 310 when the shell 100 is pivoted.

The rotation of the shell 100 in respect to the tubular rails 400 is stopped when the latch 242 is disposed against the stop 312 (see FIG. 5). The shell 100 is at an inverted position relative to the position shown in FIGS. 1–4. Therefore, the tubular rails 40 can be folded, i.e., the playpen can be collapsed.

While this invention has been explained in relation to its preferred embodiment, it is to be understood that variations thereof will be apparent to those skilled in the art upon reading this specification. Therefore, this invention is intended to cover all such variations as shall fall within the scope of the appended claims.

What is claimed is:

1. A joint of a playpen, the joint comprising:

a shell;

a first block pivotally received in the shell and defining a longitudinal recess and a longitudinal slot in communication with the longitudinal recess defined therein;

a second block pivotally received in the shell;

a first tubular element secured in a tubular rail and defining a longitudinal slit with an open end, a first axial passage, and a second axial passage;

a second tubular element secured in another tubular rail and defining a first axial passage and a second axial passage;

a first bolt with a head, the first bolt inserted through the second axial passage defined in the first tubular element and secured to the first block, while the head thereof is retained in the first axial passage defined in the first tubular element;

a second bolt with a head, the second bolt inserted through the second axial passage defined in the second tubular element and secured to the second block, while the head thereof is retained in the first axial passage defined in the second tubular element;

a spring received in the longitudinal recess defined in the first block;

a latch received in the longitudinal recess defined in the first block;

whereby the latch is biased by the spring into the longitudinal slit thus keeping the shell from being pivoted relative to the tubular rail, the latch can be disengaged from the longitudinal slit thus allowing the shell to be pivoted relative to the tubular rail.

2. A joint according to claim 1 comprising a trigger secured to the latch and inserted through the longitudinal slot.

3. A joint according to claim 1 wherein the first tubular element comprising a slope descending from the open end of the longitudinal slit to a longitudinal stop diametrically opposite to the longitudinal slit.

4. A joint of a playpen, the joint comprising:

a shell comprising a strip and two walls projecting from the strip and defining a first transverse passage and a second transverse passage;

a first block defining a transverse passage, a longitudinal passage in communication with the transverse passage defined therein, a longitudinal recess in communication with the longitudinal passage defined therein and a longitudinal slot in communication with the longitudinal recess defined therein, the first block disposed in the shell so that the transverse passage defined therein is aligned with the first transverse passage defined in the shell;

a spring received in the longitudinal recess defined in the first block;

a latch and a trigger transversely projecting from the latch, the latch received in the longitudinal recess defined in the first block while the trigger is inserted through the longitudinal slot defined in the first block;

a first tubular element defining a longitudinal slit with an open end, a transverse passage, a first axial passage in communication with the transverse passage defined therein, a second axial passage in communication with the first axial passage defined therein;

a first bolt comprising a head and a transverse passage, whereby the first bolt is inserted through the second axial passage defined in the first tubular element and the longitudinal passage defined in the first block so that the transverse passage defined in the first bolt is aligned with the transverse passage defined in the first block and the first transverse passage defined in the shell;

a first pin inserted through the first transverse passage defined in the shell, the transverse passage defined in the first block and the transverse passage defined in the first bolt;

a second block defining a transverse passage and a longitudinal passage in communication with the transverse passage defined therein, the second block disposed in the shell so that the transverse passage defined therein is in aligned with the second transverse passage defined in the shell;

a second tubular element defining a transverse passage, a first axial passage in communication with the transverse passage defined therein and a second axial passage in communication with the first axial passage defined therein;

a second bolt comprising a head at an end and defining a transverse passage near an opposite end, whereby the second bolt is inserted through the second axial passage defined in the second tubular element and the longitudinal passage defined in the second block so that the transverse passage defined in the second bolt is aligned with the transverse passage defined in the second block and the second transverse passage defined in the shell;

a second pin inserted through the first transverse passage defined in the shell, the transverse passage defined in the second block and the transverse passage defined in the second bolt;

whereby the latch can be biased by means of the spring into the longitudinal slit thus preventing the rotation of the shell relative to the first tubular element, the latch can be disengaged from the longitudinal slit by pulling the trigger thus allowing the rotation of the shell in respect to the first tubular element.

5. A joint according to claim 4 wherein the first tubular element comprising a slope descending from the open end of the longitudinal slit to a longitudinal stop diametrically opposite to the longitudinal slit whereby the latch is slid on the slope when the shell is pivoted, the latch can be stopped by means of the stop so as to stop the shell.

* * * * *